(12) United States Patent
Wang et al.

(10) Patent No.: US 8,447,686 B1
(45) Date of Patent: May 21, 2013

(54) SYSTEM AND METHOD FOR MITIGATING MERCHANT DEBIT BALANCES

(75) Inventors: Qingli Wang, Shanghai (CN); David Yu, Peoria, AZ (US); Salvator Nkunzimana, Phoenix, AZ (US); Jin Wu, Summit, NJ (US); Weichiang Hu, Fort Lee, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1684 days.

(21) Appl. No.: 10/946,751

(22) Filed: Sep. 22, 2004

(51) Int. Cl.
*G06Q 40/00* (2012.01)

(52) U.S. Cl.
USPC .............................................. 705/38; 705/35

(58) Field of Classification Search
USPC .................................................... 705/35–40
See application file for complete search history.

(56) References Cited

U.S. PATENT DOCUMENTS

| | | | |
|---|---|---|---|
| 6,202,053 B1 * | 3/2001 | Christiansen et al. | 705/38 |
| 6,783,065 B2 * | 8/2004 | Spitz et al. | 235/380 |
| 7,006,992 B1 * | 2/2006 | Packwood | 705/38 |
| 2002/0120537 A1 * | 8/2002 | Morea et al. | 705/35 |
| 2002/0198824 A1 * | 12/2002 | Cook | 705/38 |
| 2003/0187765 A1 * | 10/2003 | Sgaraglio | 705/35 |
| 2003/0187780 A1 * | 10/2003 | Arthus et al. | 705/39 |

* cited by examiner

*Primary Examiner* — Thomas M Hammond, III
(74) *Attorney, Agent, or Firm* — Snell & Wilmer L.L.P.

(57) ABSTRACT

A system and method for collecting data about merchants or service establishments that accept credit cards or charge cards as payment for goods and services, segmenting the merchants into groups, generating risk scores for the merchants based upon each merchants' group and, based upon the risk scores, providing information to a card issuer to take remedial action for merchants that are at higher risk for entering into a debit balance.

10 Claims, 14 Drawing Sheets

Operations Online Processing:

Operations Online Processing (Daily)

Perform High Level Review of S/E Account
1. Do Not Open Case
2. Open Case
   a. Call S/E on status
   b. Send S/E letter on status
   c. Hold Funds
   d. Contact bank

Perform Detailed Review of S/E Account
1. Work an existing Case
   a. Close Case
   b. Hold funds
   c. Force Referral
   d. Cancel S/E

Data Collection Process Flow:

Sourcing Process Flow:

Operations Online Processing:

Funds Search Process Flow:

FIG. 5

| Model Variable Name | Business Description | Model Driver Sign | Model Referral Code* |
|---|---|---|---|
| yrinbus | Year in business | neg | *YRIB*** |
| esacncl | ESA cancellation in the past two weeks; | pos | ESAC |
| sestatu | SE cancelled and reinstated Indicator | pos | REIN |
| indrsk | Risky industry group indicator: Taxi, Internet, Telecommunication | pos | RIGI |
| busrrca | Concentration Risk Measure - Average ROC Amount, Ratio of last month business amount to last month ROC count | pos | ARCA |
| crdr3bv | Ratio of last month business credit to last 3 months business amount | pos | CTGR |
| cvbmt6 | Variability of monthly business volume during last 6 months | pos | VBV6 |
| cvcrdn6 | Variability of monthly credit count during last 6 months | pos | VCT6 |
| tcmrcvb | Dispute to Gross Ratio - Ratio of open-to-date dispute to 3-month business amount | pos | DTGR |
| sgnint | Signed up through internet (1 = yes, 0= no) | pos | ESGN |
| cpct | Credit Risk Score Percentile (1 to 100) | neg | *CPCT* |
| fpct | Financial Stress Score Percentile (1 to 100) | neg | *FPCT* |
| adjamt1 | Adjustment amount of last month | neg* | ADA1 |
| tcamt | Open-to-date dispute amount | pos | DISA |
| tenure | SE tenure with AMEX (in months) | neg | *TENR* |

FIG. 6

Coefficient Information:

Here is an example of how the risk score (newprob) is calculated for one segment. The coefficients below (e.g. -0.00208213) are estimated using econometric techniques and the sample data.

$$
\begin{aligned}
XBETA = \ &-6.030126 \\
&+ (\ ADJAMT1\ *\ \ -0.00208213\ ) \\
&+ (\ BUSRRCA\ *\ \ \ \ 0.00038616\ ) \\
&+ (\ CVBMT6\ *\ \ \ \ \ 0.88248620\ ) \\
&+ (\ ESACNCL\ *\ \ \ \ 1.12822064\ ) \\
&+ (\ FPCT\ *\ \ \ \ \ \ \ -0.01262323\ ) \\
&+ (\ INDRSK\ *\ \ \ \ \ 0.57308024\ ) \\
&+ (\ SESTATU\ *\ \ \ \ 2.25356150\ ) \\
&+ (\ SGNINT\ *\ \ \ \ \ 1.00545593\ ) \\
&+ (\ TCAMT\ *\ \ \ \ \ \ 0.00143024\ ) \\
&+ (\ YRINBUS\ *\ \ \ -0.03689375\ ) \\
&;
\end{aligned}
$$

RISK SCORE $= 1 / (\ 1 + EXP(-XBETA)\ );$

FIG. 7

| | | Model Segments | | | | |
|---|---|---|---|---|---|---|
| Referral Reason | SAS Variable Name | SVLT | SVHT | MVLT | MVHT | LV |
| ADA1 | adjamt1 | X | | X | | |
| ARCA | Busrrca | | X | X | | |
| CPCT | Cpct | | X | | X | |
| CTGR | crdr3bv | X | | | | |
| VBV6 | cvbmt6 | X | X | X | X | X |
| VCT6 | cvcrdn6 | | | | X | |
| ESAC | Esacncl | X | X | X | X | X |
| FPCT | Fpct | X | | X | | |
| RIGI | Indrsk | X | X | | X | X |
| REIN | Sestatu | X | X | X | X | X |
| ESGN | Sgnint | X | | X | | |
| DISA | Tcamt | X | X | X | X | X |
| DTGR | Tcmrcvb | | | | | X |
| TENR | Tenure | X | | | X | X |
| YRIB | Yrinbus | | | X | | |

FIG. 8

SVLT SEGMENT (SMALL VOLUME AND LOW TENURE: 1K<CHARGE VOLUME<=10K AND TENURE<=18 MONTHS)

$$\begin{aligned}
\text{XBETA} = \ & -7.584768 \\
& + (\ \text{ADJAMT1} \ * \quad -0.00034878\ ) \\
& + (\ \text{CRDR3BV} \ * \quad 0.29680255\ ) \\
& + (\ \text{CVBMT6} \ * \quad 3.31773899\ ) \\
& + (\ \text{ESACNCL} \ * \quad 1.94369848\ ) \\
& + (\ \text{FPCT} \ * \quad -0.01968710\ ) \\
& + (\ \text{INDRSK} \ * \quad 1.25250042\ ) \\
& + (\ \text{SESTATU} \ * \quad 2.60646436\ ) \\
& + (\ \text{SGNINT} \ * \quad 1.14485428\ ) \\
& + (\ \text{TCAMT} \ * \quad 0.00151795\ ) \\
& + (\ \text{TENURE} \ * \quad -0.43849041\ ) \\
& \ ;
\end{aligned}$$

RISK SCORE $= 1 / (\ 1 + \text{EXP}(-\text{XBETA})\ )$;

FIG. 9

SVHT SEGMENT (SMALL VOLUME AND HIGH TENURE: 1K<CHARGE VOLUME<=10K AND TENURE>18 MONTHS)

$$\begin{aligned}
\text{XBETA} = \ & -7.628801 \\
& + (\ \text{BUSRRCA} \ * \quad 0.00104088\ ) \\
& + (\ \text{CPCT} \ * \quad -0.01685634\ ) \\
& + (\ \text{CVBMT6} \ * \quad 0.69051555\ ) \\
& + (\ \text{ESACNCL} \ * \quad 2.36070997\ ) \\
& + (\ \text{INDRSK} \ * \quad 1.20609593\ ) \\
& + (\ \text{SESTATU} \ * \quad 1.43360811\ ) \\
& + (\ \text{TCAMT} \ * \quad 3.42102783\ ) \\
& \ ;
\end{aligned}$$

RISK SCORE $= 1 / (\ 1 + \text{EXP}(-\text{XBETA})\ )$;

FIG. 10

MVLT SEGMENT (MEDIUM VOLUME AND LOW TENURE: 10K<CHARGE VOLUME<=100K AND TENURE<=18 MONTHS)

$$\begin{aligned}
\text{XBETA} = &-6.030126 \\
&+ (\text{ADJAMT1} * -0.00208213) \\
&+ (\text{BUSRRCA} * 0.00038616) \\
&+ (\text{CVBMT6} * 0.88248620) \\
&+ (\text{ESACNCL} * 1.12822064) \\
&+ (\text{FPCT} * -0.01262323) \\
&+ (\text{INDRSK} * 0.57308024) \\
&+ (\text{SESTATU} * 2.25356150) \\
&+ (\text{SGNINT} * 1.00545593) \\
&+ (\text{TCAMT} * 0.00143024) \\
&+ (\text{YRINBUS} * -0.03689375) ;
\end{aligned}$$

RISK SCORE = 1 / ( 1 + EXP(-XBETA) );

FIG. 11

MVHT SEGMENT (MEDIUM VOLUME AND HIGH TENURE: 10K<CHARGE VOLUME<=100K AND TENURE>18 MONTHS)

$$\begin{aligned}
\text{XBETA} = &-6.421430 \\
&+ (\text{CPCT} * -0.02882676) \\
&+ (\text{CVBMT6} * 1.50914406) \\
&+ (\text{CVCRDN6} * 0.57339594) \\
&+ (\text{ESACNCL} * 1.37690340) \\
&+ (\text{INDRSK} * 1.05456139) \\
&+ (\text{SESTATU} * 1.54055406) \\
&+ (\text{TCAMT} * 0.00055739) \\
&+ (\text{TENURE} * -0.00755169) ;
\end{aligned}$$

RISK SCORE = 1 / ( 1 + EXP(-XBETA) );

FIG. 12

LV SEGMENT (LARGE VOLUME: $100K<CHARGE VOLUME<=1MM)

```
XBETA    =    -4.724042
              + ( CVBMT6  *    0.83497967 )
              + ( ESACNCL *    1.26396149 )
              + ( FPCT    *   -0.02760626 )
              + ( INDRSK  *    0.85416230 )
              + ( SESTATU *    1.77237060 )
              + ( TCMRCVB *    4.32513839 )
              + ( TENURE  *   -0.00847179 )
                                           ;

RISK SCORE  = 1 / ( 1 + EXP(-XBETA) );
```

FIG. 13A

| Referral Reason Code | Business Description | IMS/VW Screens | Suggested Analysis |
|---|---|---|---|
| ESAC | ESA cancellation in the past two weeks. | SNSYN = Synopsis<br>SIMTS = Monthly Statistics<br>SIMVL = Monthly Volume<br>SIPND = Pending Paid<br>FSSEI = SE Fraud Detail Inquiry<br>FSFVI = Fraud Volume Inquiry | • Confirm ESA cancellation by reviewing memos (Synopsis).<br>• Refer to Reviewing Synopsis for additional assistance.<br>• Monthly Statistics - How is the volume trending? (refer to Volume Pattern Guidelines for additional assistance.)<br>• Review AXIOM for disputes (refer to Reviewing the AXIOM Reports for additional assistance).<br>• Fluctuations in business volume.<br>• Review tenure. |
| REIN | SE cancelled and reinstated indicator. | SNSYN = Synopsis<br>SIMTS = Monthly Statistics<br>SIMVL = Monthly Volume<br>SIPND = Pending Paid<br>FSSEI = SE Fraud Detail Inquiry<br>FSFVI = Fraud Volume Inquiry | • Confirm ESA cancellation by reviewing memos (Synopsis).<br>• Refer to Reviewing Synopsis for additional assistance.<br>• Monthly Statistics - How is the volume trending? (refer to Volume Patter Guidelines for additional assistance.)<br>• Review AXIOM for disputes (refer to Reviewing the AXIOM Reports for additional assistance.)<br>• Monthly Statistics - Fluctuations in business volume.<br>• Review tenure. |

| Referral Reason Code | Business Description | IMS/VW Screens | Suggested Analysis |
|---|---|---|---|
| RIGI | Risky industry group indicator Taxi, Internet, and Telecommunication. | SNSYN - Synopsis<br>SIMTS = Monthly Statistics<br>SIMVL = Monthly Volume | • Monthly Statistics - How is the volume trending? (refer to Volume Patter Guidelines for additional assistance.)<br>• Review AXIOM for disputes (refer to Reviewing the AXIOM Reports for additional assistance).<br>• Monthly Statistics - Fluctuations in business volume. |
| ARCA | Average ROC amount, which is determined by last month's business dollars divided by last month's total number of ROCS. ($#) | SNSYN - Synopsis<br>SIMTS = Monthly Statistics<br>SIMVL = Monthly Volume<br>SISOC = Summary of Charge Transactions<br>SIROC = Record of Charge Transactions<br>SIVAG | • Verify the charge.<br>• Determine if one or two Cardmembers are involved?<br>• Are there international Cardmembers involved?<br>• Low volume of ROCs, but high individual ROC amounts.<br>• Possible Fraud/CRAT referral to Submission Monitor.<br>• Several different Cardmembers involved, call the Merchant to discuss.<br>• Review AXIOM for disputes (refer to Reviewing the AXIOM Reports for additional assistance). |
| CTGR | Ratio of last month business credit ROCS to last 3 months business volume. ($/$) | SNSYN - Synopsis<br>SIMTS = Monthly Statistics<br>SIMVL = Monthly Volume<br>SIPND = Pending Paid<br>SISOC = Summary of Charge Transactions<br>SIROC = Record of Charge Transactions<br>SISTT = Account Summary | • Normal credit pattern or out of pattern?<br>• Review card accounts for credits verses charges that occurred in prior months.<br>• Consider the industry.<br>• Compare to last years volume. |

FIG. 13B

| Referral Reason Code | Business Description | IMS/VW Screens | Suggested Analysis |
|---|---|---|---|
| VBV6 | Fluctuations in monthly business volume within the last 6 months. ($/$) | SNSYN = Synopsis<br>SIMTS = Monthly Statistics<br>SIMVL = Monthly Volume | • Review current volume to the same time period for the previous year. |
| VCT6 | Fluctuations of monthly credit ROCS within the last 6 months. (##) | SNSYN = Synopsis<br>SIMTS = Monthly Statistics<br>SIMVL = Monthly Volume | • Review current volume to the same time period for the previous year. |
| DTGR | Dispute to Gross Ratio – Ratio of open-to-date dispute to 3-month business volume. | SNSYN = Synopsis<br>SIPND = Pending Paid<br>FSSEI = SE Fraud Detail Inquiry<br>FSFVI = Fraud Volume Inquiry<br>LMINQ = CM Case Review<br>ARTBX = CM Billing Review Triumph | • Disputes being resolved?<br>• Types of disputes.<br>• Processor related?<br>• Following Card acceptance policy?<br>• Using correct descriptor?<br>• Evaluate if all items where Chargeback, could the SE absorb through submissions or Debit ACH. |

FIG. 13C

| Referral Reason Code | Business Description | IMS/VW Screens | Suggested Analysis |
|---|---|---|---|
| ESGN | Signed up through the Internet (Channel 17). | SNSYN = Synopsis<br>SISTT = Account Summary<br>SIPND = Pending Paid<br>SIMTS = Monthly Statistics<br>SIMVL = Monthly Volume<br>FSSEI = SE Fraud Detail Inquiry<br>FSFVI = Fraud Volume Inquiry | • Absorbing credits/chargebacks through submissions.<br>• Consider the Industry.<br>• Tenure<br>• Dispute reasons. |
| DISA | Open-to-date dispute amount. | SNSYN = Synopsis<br>FSSEI = SE Fraud Detail Inquiry<br>FSFVI = Fraud Volume Inquiry<br>SIPND = Pending Paid<br>LMINQ = CM Case Review<br>ARTBX = CM Billing Review Triumph | • Disputes being resolved?<br>• Types of disputes.<br>• Processor related?<br>• Following Card acceptance policy?<br>• Using correct descriptor?<br>• Evaluate if all items where Chargeback, could the SE absorb through submissions or Debit ACH. |

FIG. 13D

SYSTEM AND METHOD FOR MITIGATING MERCHANT DEBIT BALANCES

TECHNICAL FIELD

The present subject matter relates generally to computerized systems and methods for analyzing merchants that accept credit or charge cards as payment for goods and services. More particularly, the present subject matter relates to computerized systems and methods for determining indications that merchants may be going into debit-balance with a card issuer so as to allow the card issuer to take remedial steps prior to such debit-balance occurring.

BACKGROUND

Transaction card issuers, such as issuers of charge and credit cards, issue their transaction cards to customers who wish to use the card as payment for goods or services with a merchant. When a card is issued, an account is created through which all of the card transactions are reconciled.

In order for a customer to use a transaction card at a merchant, the merchant must agree to accept the card. Therefore the merchant must have a relationship with the transaction card issuer as well. As part of the relationship between the card issuers and the merchant, the merchant will have an account with the transaction card issuer.

Generally, when a merchant accepts a transaction card as payment for a customer's purchase, the transaction card issuer debits the customer's account for the amount of the purchase and credits the merchant's account for a discounted amount. In other circumstances, such as when a customer returns an item to a merchant, the merchant's account will be debited by the transaction card issuer. If a merchant's account goes into a debit balance, the transaction card issuer may end up taking a "write-off" of the account, thereby losing money through credit loss.

Methods for dealing with such merchant debit balance problems have been reactive, fraud-focused and manually monitored. More recently, automated methods have been used to model or predict which merchants are likely to go into debit balance. However, these automated methods have applied a single model to all merchants. In addition, these automated methods do not provide a means for identifying merchants that are likely to be ongoing concerns with whom the transaction card issuer can recoup the debit balance.

A need exists, therefore, for automated methods to reduce a transaction card issuer's write-offs due to credit loss created by merchants that accounts for differences between merchants in various business segments. In addition, an automated system is needed that identifies merchants that have a workable debit balance, i.e., not only merchants that are likely to go into a debit balance, but those that will likely continue to submit charges to the transaction card issuer, so that the transaction card issuer has an opportunity to recoup the debit balance.

SUMMARY

A system and method is provided that generally collects data about merchants or service establishments that accept credit cards or charge cards as payment for goods and services, generates risk scores for the merchants based upon each merchants' classification and, based upon the risk scores, allows a card issuer to take remedial action for merchants that are at higher risk for entering into a debit balance.

It is an objective to provide a method that allows transaction card issuers to predict and reduce the amount of write-offs it must take due to credit loss from merchants.

It is another objective to provide a computer system that provides a card issuer with information about merchants that are likely to achieve a debit balance.

BRIEF DESCRIPTION OF THE DRAWINGS

FIG. 5 illustrates a table of variables that can be used to calculate a risk score.

FIG. 6 illustrates an example of a risk score calculation.

FIG. 7 illustrates a table of variables used for various model segments.

FIG. 8 illustrates a risk score calculation for a small volume, low tenure merchant.

FIG. 9 illustrates a risk score calculation for a small volume, high tenure merchant.

FIG. 10 illustrates a risk score calculation for a medium volume, low tenure merchant.

FIG. 11 illustrates a risk score calculation for a medium volume, high tenure merchant.

FIG. 12 illustrates a risk score calculation for a high volume merchant.

FIG. 13 illustrates a table showing various post-processing analysis that can be performed on merchants that have high credit risk scores.

DETAILED DESCRIPTION

Figure 1:
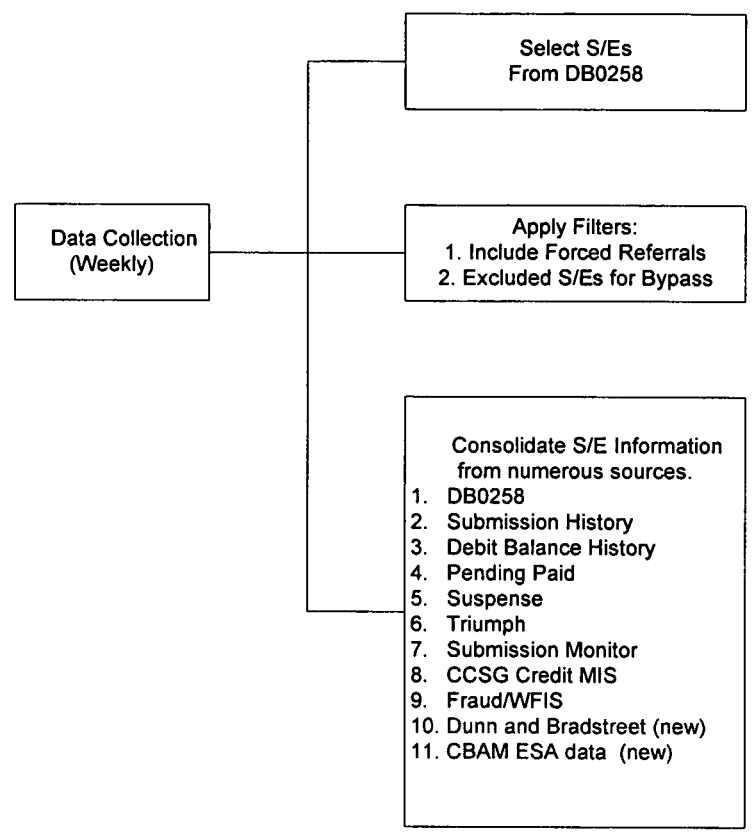
FIG. 1 illustrates a schematic flow chart of a data collection process.

Referring now to the drawings, wherein like numerals refer to like parts, a new system and process is provided that generally collects data about merchants, or service establishments, that accept transaction cards, such as credit cards or charge cards, as payment for goods and services, generates risk scores for the merchants and based upon the risk scores and allows a card issuer to take remedial action for merchants that are at higher risk for entering into a debit balance. The process includes, generally, four (4) types of processes, namely a data collection Process (FIG. 1), a sourcing process (FIG. 2), an operations process (FIG. 3) and a funds search process (FIG. 4).

As shown in FIG. 1 a flow chart 10 of the data collection process is generally shown. As shown, the process is indicated as being performed weekly 12. Of course, the process may be done periodically in other time periods that are longer or shorter than weekly. Initially, a number of merchants or service establishments are selected 14 from a computer database of a card issuer merchants and the selection process generally can be done by a computer with specifically programmed computer software. After the merchants are selected, a filtering process 16 is applied to include or exclude certain selected merchants to be evaluated or have its credit risk scored calculated. Again, the filtering process generally can be done by a computer with specifically programmed computer software. Finally, during the data collection process, which can also be done by a computer running specifically programmed computer software, merchant data is collected and/or consolidated for the merchants that are going to be analyzed 18. Data that is collected can include internal data, e.g., data a card issuer has about a service establishment based on the merchant's past history with the card issuer, and external data, e.g., Dunn & Bradstreet data, as well as data that must be generated, e.g., the number of years a merchant has been in business. Of course other data can be used as well. As shown, eleven types of data are obtained. Each of the processes above can be run on one or more computers, using one or more processors an using one or more computer software programs.

Figure 2:
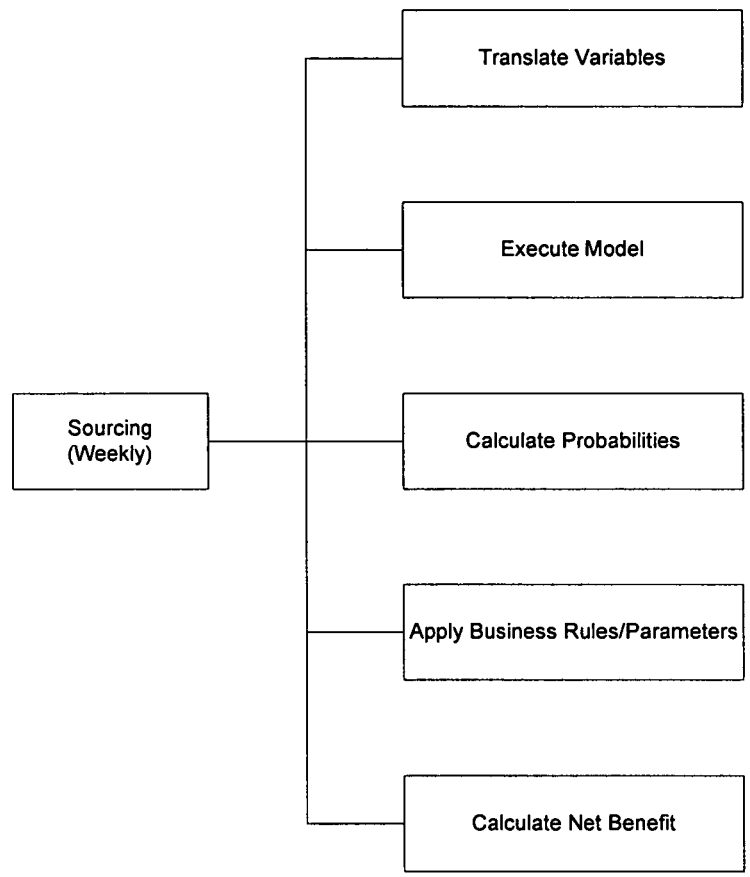
FIG. 2 illustrates a schematic flow chart of a sourcing process.

As shown in FIG. 2, a flow chart 20 of the sourcing process is shown. The sourcing process can also be done periodically, such as weekly 22. Of course, other periods can be used, and they can be longer or shorter than weekly. In the sourcing process, a card issuer generally translates variables 24, executes a debit balance predictor model 26, calculates probabilities 28, applies business rules and/or parameters 30 and then calculates a net benefit 32. Each of these sub-processes will be explained in more detail below.

Examples of variables that are translated for one illustrative model are illustrated in the table 40 shown in FIG. 5. As shown, the variables may have a name 42, a business description associated with the name 44, a model driver sign 46, i.e., whether the variable will increase or decrease a credit risk score for a particular service establishment, and a model referral code 48.

The data collection process of the model will provide or generate values for each of the variables. Using these values, the debit balance predictor model is executed 26 and risk scores are calculated for each merchant. The risk score is calculated by applying certain coefficients to selected of the variables and calculating a score. An example of how a risk score may be calculated is shown in FIG. 6. Of course other coefficients and/or variables may be used as well. In addition, not all of the variables shown need to be used for a particular model or other variables not shown can be used.

As shown in the table 54 of FIG. 7, merchants may be segmented into different model segments or groups. As shown, there are 5 different model groups, and different variables are used in calculating the risk scores for each group. For example, a merchant may fall into one of five different groups, namely a small volume, high tenure group 56 (merchants with between $1000 and $10,000 in business volume in the last 12 months and that have been in existence for less than or equal to 18 months), a small volume, high tenure group 58 (merchants with between $1000 and $10,000 in business volume in the last 12 months and that have been in existence for more than 18 months), a medium volume, low tenure group 60 (merchants with between $10,001 and $100,000 in business volume in the last 12 months and that have been in existence for less than or equal to 18 months), a medium volume, high tenure group 62 (merchants with between $10,001 and $100,000 in business volume in the last 12 months and that have been in existence for more than 18 months), and a large volume group 64 (merchants with between $100,001 and $1,000,000 in business volume in the last 12 months). The table 54 also indicates which variables are used to calculate a risk score for merchants in each group.

A model risk score calculation for a small volume, low tenure merchant is shown in FIG. 8. As shown, ten (10) variables are used for merchants in this category. Each variable has a co-efficient associated therewith to calculate the risk score.

A model risk score calculation for a small volume, low tenure merchant is shown in FIG. 9. As shown, seven (7) variables are used for merchants in this category. Note that the coefficients used for a particular variable can vary from model to model. For example, the coefficient for the open-to date dispute amount (tcamt) is 3.42102783 for the small volume, high tenure merchant (FIG. 9), but is 0.00151795 for the low volume, low tenure merchant (FIG. 8). Each variable has a co-efficient associated therewith to calculate the risk score.

A model risk score calculation for a medium volume, low tenure merchant is shown in FIG. 10. As shown, ten (10) variables are used. Each variable has a co-efficient associated therewith to calculate the risk score.

A model risk score calculation for a medium volume, high tenure merchant is shown in FIG. 11. As shown, eight (8) variables are used. Each variable has a co-efficient associated therewith to calculate the risk score.

A model risk score calculation for a high volume merchant is shown in FIG. 12. As shown, seven (7) variables are used. Each variable has a co-efficient associated therewith to calculate the risk score.

After risk scores are calculated for all desired merchants, a card issuer can analyze or evaluate the scores and take action on merchants that have the highest risk scores. For example a card issuer may take action for the merchants with the highest 5% of risk scores. Action may include referring the merchant to the card issuer's production or operations team for remedial action and post modeling processing.

Processes and procedures can then be taken which may prevent the merchants with high risk scores from going into debit balance situations. Examples of such processes and procedures, i.e., post-modeling processing and remedial actions, are forth in FIGS. 3 and 4. For example, a report of high credit-risk score merchants can be generated and provided, via a computer or computer network, to an employee or representative of the card issuer. The employee or representative can then take actions that may be suggested by the computer program which applies business rules and parameters to the variables for the merchant, to help prevent the merchants with high risk scores from going into debit balance situations. Using the post-modeling processing steps different analysis can be performed on a given merchant by using business rules and/or parameters based on the merchant's variable information. Various actions can be taken by the card issuer in order to prevent the merchant from eating into debit balance an be taken, such as those actions shown in the column entitled "Suggested Analysis" in FIG. 13, each of which is associated with a particular referral reason which may appear on a screen of a computer report for the card issuer employee or representative responsible for such actions.

Figure 3:
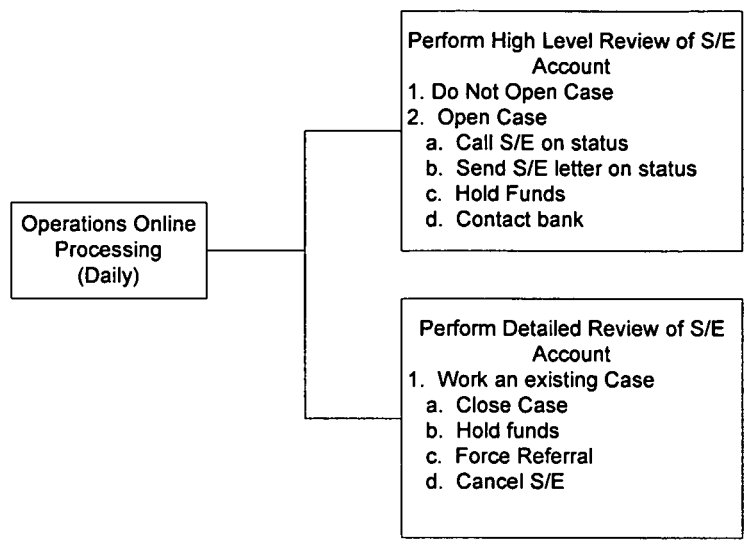
FIG. 3 illustrates a schematic flow chart of an operations process.
Figure 4:
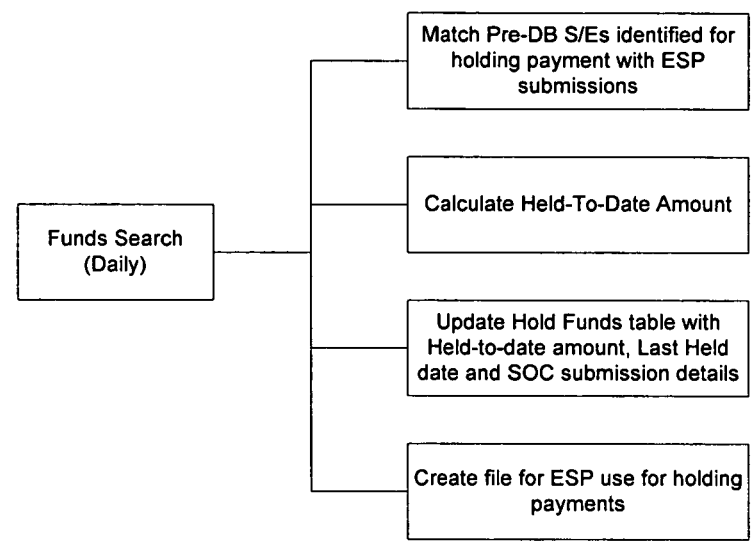
FIG. 4 illustrates a schematic flow chart of a funds search process.

For example, as shown in the flow chart 70 of operations on-line processing shown in FIG. 3, a high level of review 72 may be performed and/or a detailed level of review 74 may be performed for each merchant. The reviews 72 and 74 may occur daily 76, or in any other period desired. If a high level of review 72 is performed, actions that can be taken include, for example, calling the merchant to discuss its account with the card issuers, sending the merchant a letter about the status of its account, holding funds from the merchant's account or contacting the bank which holds the merchant's account. Similarly if a detailed review 74 is performed, action that can be taken include, for example, holding the merchant's funds, referring the case to a customer service representative or canceling the merchant's ability to accept the issuer's card as payment.

In addition, as shown in the table 80 a funds search process may be implemented for a merchant. The funds search may be done daily 82, or in any other desired time period. By performing A funds search, a card issuer can try to recoup any losses or prevent losses from accruing due to a merchant's debit balance.

The processing and methods described above, e.g. the processes described with respect to FIGS. 1-4, may take place on computers or computer systems using software to perform the functions described herein. For example, a system may includes a computer having one or more memory storage devices, e.g. a memory for storing executable code and a memory for storing data used by the code, and a processor for executing instructions generated by the code.

It should be understood that many of the data gathering, risk score calculation and post processing functions described herein may be implemented on computers or computer systems, which of course may be connected for data communication via the components of a network. The hardware of such computer platforms typically is general purpose in nature, albeit with an appropriate network connection for communication via the intranet, the Internet and/or other data networks.

As known in the data processing and communications arts, each such general-purpose computer typically comprises a central processor, an internal communication bus, various types of memory (RAM, ROM, EEPROM, cache memory, etc.), disk drives or other code and data storage systems, and one or more network interface cards or ports for communication purposes. The computer system also may be coupled to a display and one or more user input devices (not shown) such as alphanumeric and other keys of a keyboard, a mouse, a trackball, etc. The display and user input element(s) together form a service-related user interface, for interactive control of the operation of the computer system. These user interface elements may be locally coupled to the computer system, for example in a workstation configuration, or the user interface elements may be remote from the computer and communicate therewith via a network. The elements of such a general-purpose computer system also may be combined with or built into routing elements or nodes of the network, such as the IWF or the MSC.

The software functionalities (e.g., the processes shown and described with respect to FIGS. 1-4) involve programming, including executable code as well as associated stored data. The software code is executable by the general-purpose computer that functions as the particular computer, e.g. ?? (FIG. ?). In operation, the executable program code and possibly the associated data are stored within the general-purpose computer platform. At other times, however, the software may be stored at other locations and/or transported for loading into the appropriate general-purpose computer system. Hence, the embodiments involve one or more software products in the form of one or more modules of code carried by at least one machine-readable. Execution of such code by a processor of the computer platform enables the platform to implement the data gathering and risk score calculation functions, in essentially the manner performed in the embodiments discussed and illustrated herein.

As used herein, terms such as computer or machine "readable medium" refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in any computer(s) operating as one computer server platforms. Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The present subject matter has been described above with reference to exemplary embodiments. However, those skilled in the art having read this disclosure will recognize that changes and modifications may be made to the exemplary embodiments without departing from the scope of the present invention.

We claim:

1. A computer-implemented method comprising:
   collecting, by a computer-based system for mitigating merchant risk, merchant data corresponding to merchants that accept transaction accounts issued by the transaction account issuer as payment, wherein the computer-based system comprises at least a computer processor;
   segmenting, by the computer-based system, the merchants into groups based on a predetermined merchant criterion;
   determining, by the computer-based system, a group scoring model for each group in the plurality of groups, wherein the scoring models are different for each group and wherein each scoring model comprises at least five variables and a predefined coefficient corresponding to each variable, and wherein each coefficient varies according to the scoring model;
   calculating, by the computer-based system, a risk score for each of the merchants based upon the corresponding merchant data and by applying the corresponding group scoring model;
   determining, by the computer-based system, a suggested analysis for each of the merchants based on the corresponding generated risk score, wherein the suggested analysis comprises a plurality of risk reduction tasks and is based upon at least one of the corresponding collected merchant data and a predetermined business rule;
   at least one of providing, by the computer-based system, a user interface showing data associated with the plurality of risk reduction tasks and generating, by the computer-based system, a report for the suggested analysis of at least one merchant; and
   executing, by the computer-based system, the plurality of risk reduction tasks, wherein at least one of the plurality of risk reduction tasks prevents the corresponding merchant from adding to a debit balance, and wherein the debit balance is owed to the transaction account issuer by the corresponding merchant.

2. The method of claim 1, wherein the predetermined merchant criterion includes information about volumes of sales of the merchants over a predetermined time period.

3. The method of claim 1, wherein the predetermined merchant criterion includes information about numbers of years the merchants have been in business.

4. The method of claim 1, wherein each generated report includes a referral reason based on the corresponding collected merchant data.

5. A system comprising:
a computer processor for mitigating merchant risk,
a tangibly, non-transitory memory configured to communicate with the computer processor,
the tangible, non-transitory memory having instructions stored thereon that, in response to execution by the computer processor, cause the computer processor to perform operations comprising:
collecting merchant data corresponding to merchants that accept transaction accounts issued by the transaction account issuer as payment;
segmenting the merchants into groups based on a predetermined merchant criterion;
determining a group scoring model for each group in the plurality of groups, wherein the scoring models are different for each group and wherein each scoring model comprises at least five variables and a predefined coefficient corresponding to each variable, and wherein each coefficient varies according to the scoring model;
calculating a risk score for each of the merchants based upon the corresponding merchant data and by applying the corresponding group scoring model;
determining a suggested analysis for each of the merchants based on the corresponding generated risk score, wherein the suggested analysis comprises a plurality of risk reduction tasks and is based upon at least one of the corresponding collected merchant data and a predetermined business rule;
at least one of providing a user interface showing data associated with the plurality of risk reduction tasks and generating, by the processor, a report for the suggested analysis of at least one merchant; and
executing the plurality of risk reduction tasks, wherein at least one of the plurality of risk reduction tasks prevents the corresponding merchant from adding to a debit balance, and wherein the debit balance is owed to the transaction account issuer by the corresponding merchant.

6. The system of claim 5, wherein the predetermined merchant criterion includes information about volumes of sales of the merchants over a predetermined time period.

7. The system of claim 5, wherein the predetermined merchant criterion includes information about numbers of years the merchants have been in business.

8. The system of claim 5, wherein the predetermined merchant criterion includes information about volumes of sales of the merchants over a predetermined time period and includes information about numbers of years the merchants have been in business.

9. The system of claim 5, the operations further comprising designating the one or more of the merchants as high risk merchants when the generated risk score corresponding to the one or more of the merchants lies within a predetermined top percentile range of risk scores relative to a total number of generated risk scores.

10. An article of manufacture including a tangible, non-transitory computer-readable storage medium having computer-executable instructions stored thereon that, in response to execution by a computer-based system for mitigating merchant risk, cause the computer-based system to perform operations comprising:
collecting merchant data corresponding to merchants that accept transaction accounts issued by the transaction account issuer as payment;
segmenting the merchants into groups based on a predetermined merchant criterion;
determining a group scoring model for each group in the plurality of groups, wherein the scoring models are different for each group and wherein each scoring model comprises at least five variables and a predefined coefficient corresponding to each variable, and wherein each coefficient varies according to the scoring model;
calculating a risk score for each of the merchants based upon the corresponding merchant data and by applying the corresponding group scoring model;
determining a suggested analysis for each of the merchants based on the corresponding generated risk score, wherein the suggested analysis comprises a plurality of risk reduction tasks and is based upon at least one of the corresponding collected merchant data and a predetermined business rule;
at least one of providing a user interface showing data associated with the plurality of risk reduction tasks and generating, by the computer, a report for the suggested analysis of at least one merchant; and
executing the plurality of risk reduction tasks, wherein at least one of the plurality of risk reduction tasks prevents the corresponding merchant from adding to a debit balance, and wherein the debit balance is owed to the transaction account issuer by the corresponding merchant.

* * * * *

UNITED STATES PATENT AND TRADEMARK OFFICE
CERTIFICATE OF CORRECTION

PATENT NO. : 8,447,686 B1
APPLICATION NO. : 10/946751
DATED : May 21, 2013
INVENTOR(S) : Qingli Wang et al.

Page 1 of 1

It is certified that error appears in the above-identified patent and that said Letters Patent is hereby corrected as shown below:

In the Claims

In Claim 5 Column 7 Line 6, please delete "tangibly" and insert therefor --tangible--.

Signed and Sealed this
Eighteenth Day of March, 2014

Michelle K. Lee
*Deputy Director of the United States Patent and Trademark Office*